(12) United States Patent
Teyssedre et al.

(10) Patent No.: US 7,670,977 B2
(45) Date of Patent: Mar. 2, 2010

(54) BLUE GLASS COMPOSITION INTENDED FOR THE MANUFACTURE OF WINDOWS

(75) Inventors: Laurent Teyssedre, Paris (FR); Dominique Sachot, Ozoir-la-Ferriere (FR); Pierre Jeanvoine, Poissy (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/249,323

(22) Filed: Oct. 10, 2008

(65) Prior Publication Data

US 2009/0042712 A1 Feb. 12, 2009

Related U.S. Application Data

(63) Continuation of application No. 10/498,111, filed as application No. PCT/FR02/04282 on Dec. 11, 2002, now abandoned.

(30) Foreign Application Priority Data

Dec. 19, 2001 (FR) .................... 01 16455

(51) Int. Cl.
*C03C 3/087* (2006.01)
(52) U.S. Cl. .......................... 501/71; 501/70
(58) Field of Classification Search ............ 501/70, 501/71
See application file for complete search history.

(56) References Cited

U.S. PATENT DOCUMENTS

| 5,582,455 | A | 12/1996 | Casariego et al. |
| 5,688,727 | A | 11/1997 | Shelestak et al. |
| 5,837,629 | A | 11/1998 | Combes et al. |
| 6,313,053 | B1 | 11/2001 | Shelestak |
| 7,033,967 | B2 | 4/2006 | Foguenne et al. |
| 7,169,722 | B2 | 1/2007 | Landa et al. |
| 7,304,009 | B2 | 12/2007 | Coster et al. |
| 2004/0077479 | A1 | 4/2004 | Coster et al. |
| 2004/0110625 | A1 | 6/2004 | Smith et al. |
| 2004/0157723 | A1 | 8/2004 | Foguenne et al. |

FOREIGN PATENT DOCUMENTS

WO 02/07249 1/2002

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

The invention relates to a glass composition of silica-soda-lime type colored blue which comprises the coloring agents below in a content varying within the following limits, by weight:

| | |
|---|---|
| $Fe_2O_3$ (total iron) | 0.2 to 0.51% |
| CoO | 10 to 50 ppm |
| $Cr_2O_3$ | 10 to 300 ppm |
| CuO | 0-400 ppm | the glass exhibiting a redox factor of less than 0.35, a dominant wavelength $\lambda_D$ of between 485 and 489 nm, an excitation purity of less than 13% and a selectivity at least equal to 1.1 under a thickness of between 3 and 5 mm.

It also relates to the glass sheet obtained from the abovementioned composition, said sheet being intended in particular to form an automobile window or for the construction industry.

22 Claims, No Drawings

BLUE GLASS COMPOSITION INTENDED FOR THE MANUFACTURE OF WINDOWS

CROSS REFERENCE TO RELATED APPLICATIONS

This application is a continuation of U.S. patent application Ser. No. 10/498,111 filed Oct. 7, 2004 now abandoned, which is the U.S. national stage of International Application No. PCT/FR02/04282, filed Dec. 11, 2002. This application claims priority to French Patent Application No. 01/16455, filed Dec. 19, 2001.

The invention relates to a glass composition of silica-soda-lime type colored blue. More particularly, the invention relates to a blue glass composition for the preparation of flat glasses by floating on a bath of molten metal, such as tin (float process), these flat glasses being intended in particular, but not exclusively, to form windshields and side windows situated at the front of a vehicle.

Automobile windows are subject to very strict requirements. As regards optical properties, these requirements are governed by regulations, for example with regard to the light transmission of a windshield or else with regard to the comfort of the user, in particular as concerns the energy transmission.

In addition to the constraints related to the light transmission and to the energy transmission, the windows situated at the front of vehicles also have to meet the wishes of automobile manufacturers as regards the color, in particular relating to the dominant wavelength and to the purity.

Iron is a coloring agent which fully satisfies these requirements. The presence of iron in the form of ferrous ions $Fe^{2+}$, distinct from ferric ions $Fe^{3+}$, makes it possible to reduce the transmission of infrared radiation through the glass and therefore to lower the energy transmission. In addition, iron introduces a green coloring which matches well the color of the majority of automobiles.

Nevertheless, the combination of a bluish body and of a green window proves in many cases to be rather unsatisfactory from an esthetic viewpoint. This is why automobile manufacturers wish to have available glasses exhibiting a relatively neutral blue color, that is to say exhibiting a wavelength which is not too low and a purity which is not too high, for a significant level of light transmission and also a moderate energy transmission.

A blue coloring can be obtained simply by adding cobalt oxide to the glass composition. The major disadvantage of this oxide is that it leads to a reduction in the light transmission of the glass, the transmission of infrared radiation through the glass for its part being only very slightly affected.

Another way of coloring the glass blue consists in using iron as sole coloring agent, provided, however, that the redox factor (content of ferrous ions FeO/total content of ferrous ions and of ferric ions $Fe_2O_3$) is maintained at a relatively high value, of the order of 50%. Such a high redox factor presents problems with regard to the implementation of the process as the melting of the glass is rendered more difficult, which increases in proportion the risk of seeing the appearance in the glass of inclusions of incompletely melted material, such as silica. In addition, under such reducing conditions, the iron is liable to react with the sulfate used for the refining of the glass in the bath to form iron sulfide, which gives the glass a yellow to brown coloring.

Blue-colored glasses can also be obtained by combining several coloring agents.

In EP-A-0 820 964, a mixture combining iron (0.4 to 1.1%) and cobalt oxide (10 to 75 ppm) is used to form a blue glass having a dominant wavelength varying from 480 to 490 nm and an excitation purity of at least 6%. The proportion of iron in the ferrous state is between 20 and 40%. The coloring effect, related essentially to the presence of cobalt oxide in the glass, is reflected by a very strong blue color.

In EP-A-0 814 064, provision is made to combine iron (0.53 to 1.1%), cobalt oxide (5 to 40 ppm) and optionally chromium oxide (up to 100 ppm) to form blue glasses exhibiting a dominant wavelength varying from 485 to 491 nm and a purity varying from 3 to 18%. The redox is between 0.25 and 0.35.

In EP-A-1 023 245, use is made, as above, of iron (0.4 to 1.0%), cobalt oxide (4 to 40 ppm) and optionally chromium oxide (up to 100 ppm) to form a glass exhibiting a dominant wavelength varying from 485 to 489 nm and an excitation purity ranging from 3 to 18%. This glass is prepared at a redox of between 0.35 and 0.6, which is not a usual redox value for the float process. It is therefore necessary in this case to use specific heating means to melt the composition, as already specified above. This is consequently reflected by an increase in the cost of the glass produced.

To rapidly respond to market demand is a constant concern of manufacturers of glass in general and more particularly of colored glasses for the automobile industry, where the color range is relatively broad. The processes for producing the blue glasses mentioned above are carried out with a total iron content at least equal to 0.4% and/or under relatively high redox conditions. They generally operate with a given glass composition and it is not recommended to adjust the nature or the content of the components participating in the composition of the vitrifiable mixture. This is because any change in the composition of the glass in the furnace requires a transition time during which the glass produced does not have the expected optical properties and the expected coloring. This transition time increases in proportion as the content of coloring agents increases. Furthermore, limiting the content of iron, in particular of ferrous iron, introduces an additional advantage as the energy requirement for melting the glass composition is less, which contributes to reducing the cost of the glass.

The present invention intends to provide a glass composition of silica-soda-lime type which makes it possible to form a blue-colored glass which overcomes the abovementioned disadvantages. More specifically, an aim of the present invention is to provide a composition capable of being employed under the conditions of the float process to form a glass exhibiting a blue coloring and having spectral properties compatible with use as automobile window or in the construction industry, said composition comprising a reduced content of coloring agents, in particular of iron. The low content of iron in the composition according to the invention makes it possible to be able to prepare the glass in a float plant suited to the production of "clear" glass, in which the content of iron generally does not exceed 0.6%. This type of plant proves to be particularly advantageous economically for the reasons explained above.

Better still, the invention makes it possible to provide a blue glass suitable for forming an automobile window which, for a thickness varying from 3 to 5 mm, exhibits a light transmission $LT_A$ at least equal to 60% and a selectivity at least equal to 1.1.

These aims are achieved according to the present invention by the blue glass composition of silica-soda-lime type which comprises the coloring agents below in a content varying within the following limits, by weight:

| | |
|---|---|
| Fe$_2$O$_3$ (total iron) | 0.2 to 0.51% |
| CoO | 10 to 50 ppm |
| Cr$_2$O$_3$ | 10 to 300 ppm |
| CuO | 0 to 400 ppm | the glass exhibiting a redox factor of less than or equal to 0.35, a dominant wavelength $\lambda_D$ of between 485 and 489 nm, an excitation purity of less than 13% and a selectivity at least equal to 1.1 under a thickness varying between 3 and 5 mm.

The expression "silica-soda-lime" is used here in the broad sense and relates to any glass composition which comprises the following constituents (as % by weight):

| | |
|---|---|
| SiO$_2$ | 64-75% |
| Al$_2$O$_3$ | 0-5% |
| B$_2$O$_3$ | 0-5% |
| CaO | 5-15% |
| MgO | 0-5% |
| Na$_2$O | 10-18% |
| K$_2$O | 0-5% |
| BaO | 0-5% |

It is admitted here that the silica-soda-lime glass composition can comprise, in addition to inevitable impurities, a small proportion (up to 1%) of other constituents, for example agents which help in the melting or in the refining of the glass (SO$_3$, Cl, Sb$_2$O$_3$, As$_2$O$_3$) or which originate from a possible addition of recycled cullet to the vitrifiable mixture.

In the context of the invention, the term "redox" is understood to mean the ratio of the content by weight of the ferrous oxide, expressed in the form of FeO, to the content by weight of total iron, expressed in the form of oxide Fe$_2$O$_3$. Still in this same context, the "selectivity" is defined as being the ratio of the light transmission under illuminant A (LT$_A$) to the total energy transmission (T$_E$) for a given thickness.

The composition according to the invention makes it possible to obtain a blue-colored glass of high purity even for a significant level of light transmission. In addition, the glass formed from the composition according to the invention exhibits a high selectivity, which is particularly advantageous when the latter is intended to form windows for the construction industry or the automobile industry. This is because, with such a glass, heating related to solar radiation is limited and, for this reason, the comfort with regard to the temperature of the occupants of the building or automobile is increased. Preferably, the selectivity of the glass is equal to or greater than 1.3 and even better still is greater than or equal to 1.4.

The composition according to the invention proves to be advantageous in forming glasses which, for a thickness varying from 3 to 5 mm, have a light transmission LT$_A$ at least equal to 60%, preferably 70%, and are thus suitable for forming front side windows and windshields of automobiles.

Preferably again, the glass in accordance with the invention has an excitation purity of less than 9% and advantageously of greater than 4%.

Advantageously, the dominant wavelength of the glass obtained by virtue of the composition according to the invention is at least equal to 487 nm.

Preferably again, the glass composition in accordance with the invention comprises contents of chromium oxide and of cobalt oxide which satisfy the relationship: $100 \times Cr_2O_3/(CoO)^2 > 7$.

The use of the coloring agents within the limits of the invention makes it possible to achieve the best adjustment of the optical properties of the glass and to confer the desired blue coloring.

As already stated above, the addition of cobalt oxide to a composition comprising iron gives the glass a blue coloring but also results in a decrease in the light transmission. It is therefore essential to control the content of cobalt oxide in order for the light transmission of the glass to remain compatible with the use for which it is intended. In the majority of cases, the content of cobalt oxide varies from 15 to 40 ppm, preferably from 20 to 35 ppm.

The presence of iron in the glass composition can result from the starting materials, as impurities, or from a deliberate addition. It is known that, if the iron content is increased, the glass takes on a green color and its light transmission is reduced. Conversely, on reducing the proportion of iron, in particular in the form of ferrous ions, the performance in terms of energy transmission deteriorates without affecting the light transmission. Preferably, the total iron content in the composition is greater than 0.30%, better still greater than 0.40% and advantageously greater than 0.45%.

The chromium oxide confers a green/yellow coloring on the glass and also reduces its light transmission. The addition of chromium to a composition comprising cobalt softens the vivid blue coloring and thus moderates the intensity of the coloring, which makes it possible to retain a dominant wavelength which is not very high while having a lower purity than with cobalt alone. In the present invention, the content of chromium oxide is preferably greater than or equal to 20 ppm, better still less than or equal to 250 ppm. In a particularly advantageous way, the content of chromium oxide is between 30 to 80 ppm.

The copper oxide gives a turquoise blue coloring to the glass. It absorbs infrared radiation and, for this reason, contributes to reducing the overall energy transmission T$_E$ without significantly modifying the light transmission, which makes it possible to increase the selectivity of the glass. The introduction of copper oxide under the conditions of the float process nevertheless remains difficult as the copper has a tendency to migrate to the surface of the glass where, by reduction, it takes on a brown coloring. In order to avoid the appearance of reduced copper in the form of brown streaks in the glass ribbon, the content of copper is limited to less than 400 ppm, preferably 250 ppm. Generally, it is not necessary to add copper.

As a general rule, the optical and energy properties of a glass comprising several coloring agents are difficult to predict. They result from a complex interaction between the various coloring agents, the behavior of which is directly related to their oxidation/reduction state occasioned by the other elements present in the composition.

In the present invention, the choice of the coloring agents and of their content in the composition is the determining factor in producing the blue glass having the desired optical and energy properties.

The composition according to the invention can additionally comprise additives, for example agents which modify the optical properties in certain parts of the spectrum, in particular in the ultraviolet region, such as CeO$_2$, TiO$_2$, WO$_3$, La$_2$O$_3$ and V$_2$O$_5$, the total content of these additives not exceeding 2%, preferably 1%.

According to the invention, the redox of the glass is maintained at a value of less than or equal to 0.35, preferably of greater than 0.20 and even better still of less than 0.30, for reasons related essentially to the melting and to the refining of the glass. The redox is generally controlled using oxidizing agents, such as sodium sulfate, and reducing agents, such as coke, the relative contents of which are correctly adjusted to produce the desired redox.

According to a particularly advantageous embodiment of the invention, and in particular for applications of automobile windshield and side windows type, the overall light transmission under illuminant A ($LT_A$) is greater than or equal to 70% and the energy transmitted is less than 50%, preferably less than 48%, for a thickness of 3.85 mm.

A composition particularly suited to the production of relatively thin glass, with a thickness of the order of 3.15 mm, comprises the coloring agents below within the following limits, by weight:

| | |
|---|---|
| $Fe_2O_3$ (total iron) | >0.45% |
| FeO | >0.15% |
| CoO | 10 to 50 ppm |
| $Cr_2O_3$ | 10 to 300 ppm |
| CuO | 0 to 400 ppm |

This thin glass can be paired with another clear glass and the combination can subsequently be rolled to form a laminated glass exhibiting a light transmission $LT_A$ of greater than 70% and a selectivity of greater than 1.3 which can be used as a windshield. Preferably, such a glass exhibits an excitation purity of less than 9%.

Another composition particularly suited to the production of glasses with a thickness of the order of 3.85 mm, of use in forming automobile windows, comprises the coloring agents below within the following limits, by weight:

| | |
|---|---|
| $Fe_2O_3$ (total iron) | >0.4%, preferably >0.45% |
| FeO | >0.12%, preferably >0.15% |
| CoO | <35 ppm |
| $Cr_2O_3$ | 10 to 300 ppm |
| CuO | 0 to 400 ppm |

Such a composition makes it possible to obtain a glass exhibiting a light transmission $LT_A$ of greater than 60% and a selectivity of greater than 1.3, preferably a light transmission of greater than 70% and a selectivity of greater than 1.4.

Another composition particularly suited to the production of glasses with a thickness of the order of 4.85 mm, of use in forming windows for trucks or buses, comprises the coloring agents below within the following limits, by weight:

| | |
|---|---|
| $Fe_2O_3$ (total iron) | >0.3%, preferably >0.4% |
| FeO | >0.1%, preferably >0.13% |
| CoO | <25 ppm |
| $Cr_2O_3$ | 10 to 300 ppm |
| CuO | 0 to 400 ppm |

Such a composition makes it possible to obtain a glass exhibiting a light transmission $LT_A$ of greater than 60% and a selectivity of greater than 1.3, preferably of greater than 1.4. Advantageously, the glasses exhibit a dominant wavelength at least equal to 487 nm.

In the glasses according to the invention, the silica is generally maintained within very narrow limits for the following reasons: above approximately 75%, the viscosity of the glass and its ability to devitrify greatly increase, which makes it more difficult to melt it and to cast it on a bath of molten tin, and, below 64%, the hydrolytic resistance of the glass rapidly decreases and the transmission in the visible region also decreases.

The alkali metal oxides $Na_2O$ and $K_2O$ make it easier for the glass to melt and make it possible to adjust its viscosity at high temperatures in order to keep it close to that of a standard glass. $K_2O$ can be used up to approximately 5% as, beyond this level, the problem arises of the high cost of the composition. Furthermore, the increase in the percentage of $K_2O$ can essentially only be carried out at the expense of $Na_2O$, which contributes to increasing the viscosity. The sum of the contents of $Na_2O$ and $K_2O$, expressed as percentages by weight, is preferably equal to or greater than 10% and advantageously less than 20%.

The alkaline earth metal oxides make it possible to adjust the viscosity of the glass to the conditions for the preparation of the glass.

MgO plays an important role with regard to the viscosity and it can be used up to approximately 5%. The complete elimination of MgO, which plays an important role with regard to the viscosity, can be compensated for, at least in part, by an increase in the content of $Na_2O$ and/or $SiO_2$. Advantageously, the content of MgO is less than 2%, which has the effect of increasing the absorption capability in the infrared region without harming the transmission in the visible region.

BaO makes it possible to increase the light transmission and it can be added to the composition according to the invention in a content of less than 5%. BaO has a much weaker influence than MgO and CaO on the viscosity of the glass and the increase in its content takes place essentially at the expense of the alkali metal oxides, of MgO and in particular of CaO. Any significant increase in BaO thus contributes to increasing the viscosity of the glass, in particular at low temperatures. Preferably, the glasses according to the invention are devoid of BaO.

In addition to observing the limits defined above for the variation in the content of each alkaline earth metal oxide, it is preferable, in order to obtain the desired transmission properties, to limit the sum of the percentages by weight of MgO, CaO and BaO to a value equal to or less than 15%.

The glass composition in accordance with the invention is capable of being melted under the conditions for the production of float glass. Melting generally takes place in fired furnaces, optionally provided with electrodes, which provide for the heating of the glass in the body of the material by passing an electric current between the two electrodes. To facilitate the melting, and in particular to render the latter mechanically advantageous, the glass composition advantageously exhibits a temperature corresponding to a viscosity η such that log η=2 which is less than 1500° C., preferably a temperature corresponding to the viscosity η, expressed in poises, such that log η=3.5 (recorded as T(log η=3.5)) and a temperature at the liquidus (recorded as $T_{liq}$) which satisfy the relationship:

$T(\log \eta=3.5) - T_{liq} > 20°$ C., and preferably the relationship:

$T(\log \eta=3.5) - T_{liq} > 50°$ C.

The examples of glass compositions given below make possible a better appreciation of the advantages of the present invention.

In these examples, the values of the following properties, measured under a given thickness, are shown:

the factor for overall light transmission under illuminant A ($LT_A$) between 380 and 780 nm the factor for overall energy transmission ($T_E$) integrated between 295 and 2 500 nm according to the ISO 9050 standard (Parry Moon Mass of air 2)

the selectivity (SE), measured by the ratio of the total light transmission for the illuminant A ($LT_A$) to the total energy transmission ($T_E$)

the dominant wavelength ($\lambda_D$) under illuminant D65 the excitation purity ($P_{D65}$) under illuminant D65 the redox.

The calculations of the light transmission ($LT_A$), of the dominant wavelength ($\lambda_D$) and of the purity (P) are carried out by taking the CIE 1931 (Commission Internationale de l'Eclairage de 1931 [International Commission on Illumination of 1931]) calorimetric reference observer. For the determination of the redox, the total iron ($Fe_2O_3$) content is measured by X-ray fluorescence and the ferrous iron (FeO) content is measured chemically using the wet route. In the examples where the composition is theoretical, the redox is determined using an optical simulation program.

Each of the compositions which appears in table 1 was prepared from the following glass matrix, the contents of which are expressed as percentages by weight, this matrix being corrected with regard to the silica in order to fit the total content of coloring agents which are added:

| | |
|---|---|
| $SiO_2$ | 71.00% |
| $Al_2O_3$ | 0.70% |
| CaO | 8.90% |
| MgO | 3.80% |
| $Na_2O$ | 14.10% |
| $K_2O$ | 0.10% |

The glasses of examples 1, 11, 18 and 30 are examples prepared according to the invention, the compositions of which were measured, whereas the glasses of the other examples are given with their theoretical compositions.

These various examples show that, within a broad range of coloring agents, the compositions according to the invention make it possible to obtain blue glasses which satisfy the constraints of overall light transmission ($LT_A>60\%$) and which, in addition, exhibit a selectivity at least equal to 1.1 (tables 2 to 4).

Examples 1 to 42, prepared according to the invention, show that it is possible to obtain glasses exhibiting the desired blue coloring, that is to say a wavelength of between 485 and 490 nm, and a purity of less than or equal to 13% while offering a high light transmission (greater than 60%) and a selectivity at least equal to 1.1. These good properties of the glasses result from the combination of the coloring agents in the form of iron, cobalt, nickel and, if appropriate, copper oxides. The examples also show that the targeted optical properties can be achieved with a relatively low iron content (less than or equal to 0.51%), which is particularly advantageous when it is a matter of employing the composition in plants for the production of "clear" glass operating according to the float process.

The glasses obtained from the compositions according to the invention are compatible with the usual techniques for the manufacture of flat glass. The thickness of the glass ribbon obtained by coating the molten glass on a tin bath can vary between 0.8 and 10 mm, preferably between 3 and 5 mm, for automobile windows and between 5 and 10 mm for windows intended for the construction industry.

The window obtained by cutting from the glass ribbon can subsequently be subjected to a bending operation, in particular when it is an automobile window. It can also be subjected to other subsequent treatment operations, for example targeted at coating it with one or more layers of metal oxides for the purpose of reducing the heating thereof by solar radiation and, consequently, of reducing the heating of the passenger compartment of a vehicle fitted with it.

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $Fe_2O_3$ (%) | 0.51 | 0.51 | 0.51 | 0.51 | 0.50 | 0.40 | 0.50 | 0.50 | 0.50 | 0.50 | 0.40 | 0.40 | 0.40 | 0.40 |
| FeO (%) | 0.175 | 0.175 | 0.175 | 0.175 | 0.13 | 0.13 | 0.13 | 0.12 | 0.15 | 0.16 | 0.12 | 0.12 | 0.13 | 0.13 |
| Redox | 0.34 | 0.34 | 0.34 | 0.34 | 0.26 | 0.33 | 0.26 | 0.24 | 0.30 | 0.32 | 0.30 | 0.30 | 0.33 | 0.33 |
| CoO (ppm) | 23 | 35 | 38 | 31 | 31 | 15 | 43 | 50 | 25 | 13 | 38 | 43 | 24 | 28 |
| $Cr_2O_3$ (ppm) | 40 | 80 | 40 | 130 | 50 | 70 | 100 | 40 | 70 | 20 | 200 | 120 | 140 | 70 |
| CuO (ppm) | 0 | 0 | 0 | 0 | 0 | 0 | 0 | 0 | 0 | 0 | 0 | 0 | 0 | 0 |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| $Fe_2O_3$ (%) | 0.40 | 0.45 | 0.45 | 0.45 | 0.41 | 0.41 | 0.41 | 0.41 | 0.41 | 0.36 | 0.35 | 0.35 | 0.31 | 0.31 |
| FeO (%) | 0.10 | 0.10 | 0.15 | 0.14 | 0.12 | 0.10 | 0.10 | 0.14 | 0.12 | 0.12 | 0.10 | 0.11 | 0.09 | 0.09 |
| Redox | 0.25 | 0.22 | 0.33 | 0.31 | 0.29 | 0.24 | 0.24 | 0.34 | 0.29 | 0.33 | 0.29 | 0.31 | 0.29 | 0.29 |
| CoO (ppm) | 20 | 21 | 36 | 22 | 28 | 22 | 41 | 38 | 38 | 26 | 22 | 39 | 32 | 24 |
| $Cr_2O_3$ (ppm) | 80 | 50 | 120 | 120 | 105 | 40 | 140 | 140 | 175 | 150 | 60 | 210 | 160 | 73 |
| CuO (ppm) | 0 | 0 | 0 | 0 | 0 | 0 | 0 | 0 | 0 | 0 | 0 | 0 | 0 | 0 |

| | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| $Fe_2O_3$ (%) | 0.31 | 0.24 | 0.24 | 0.24 | 0.51 | 0.50 | 0.45 | 0.41 | 0.41 | 0.41 | 0.36 | 0.38 | 0.35 | 0.26 |
| FeO (%) | 0.105 | 0.08 | 0.082 | 0.081 | 0.175 | 0.13 | 0.10 | 0.12 | 0.14 | 0.115 | 0.123 | 0.13 | 0.11 | 0.08 |
| Redox | 0.34 | 0.33 | 0.34 | 0.34 | 0.34 | 0.26 | 0.22 | 0.29 | 0.34 | 0.28 | 0.34 | 0.34 | 0.31 | 0.31 |
| CoO (ppm) | 40 | 24 | 38 | 45 | 18 | 37 | 15 | 26 | 32 | 15 | 21 | 38 | 32 | 30 |
| $Cr_2O_3$ (ppm) | 225 | 115 | 125 | 145 | 40 | 95 | 50 | 105 | 140 | 60 | 130 | 80 | 190 | 130 |
| CuO (ppm) | 0 | 0 | 0 | 0 | 170 | 240 | 230 | 80 | 225 | 120 | 215 | 245 | 350 | 280 |

TABLE 2

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 3.85 mm |  |  |  |  |  |  |  |  |  |  |  |  |  |  |  |
| $LT_A$ (%) | 70.8 | 67.2 | 67.2 | 67.2 | 71.0 | 74.7 | 67.1 | 67.1 | 71.1 | 74.6 | 66.9 | 67.2 | 71.0 | 71.3 | 74.7 |
| $T_E$ (%) | 49.4 | 47.8 | 48.1 | 47.5 | 54.4 | 56.1 | 52.7 | 54.5 | 51.9 | 52.4 | 53.7 | 54.4 | 54.3 | 54.9 | 60.3 |
| SE | 1.43 | 1.41 | 1.40 | 1.41 | 1.31 | 1.33 | 1.27 | 1.23 | 1.37 | 1.42 | 1.25 | 1.24 | 1.31 | 1.30 | 1.24 |
| $\lambda_d$ (nm) | 488 | 487 | 486 | 489 | 489 | 488 | 488 | 486 | 489 | 489 | 489 | 486 | 489 | 486 | 489 |
| $P_{D65}$ (%) | 7.3 | 8.5 | 9.3 | 7.8 | 6.0 | 5.5 | 7.3 | 8.1 | 6.1 | 5.4 | 7.1 | 8.4 | 6.2 | 7.3 | 4.7 |
| 3.15 mm |  |  |  |  |  |  |  |  |  |  |  |  |  |  |  |
| $LT_A$ (%) | 74.2 | 71.0 | 71.0 | 71.1 | 74.4 | 77.5 | 71.0 | 71.0 | 74.4 | 77.5 | 70.9 | 71.1 | 74.3 | 74.6 | 77.6 |
| $T_E$ (%) | 54.4 | 53.1 | 53.4 | 52.8 | 59.4 | 60.8 | 57.9 | 59.5 | 57.0 | 57.3 | 58.9 | 59.5 | 59.2 | 59.8 | 64.8 |
| SE | 1.36 | 1.34 | 1.33 | 1.35 | 1.25 | 1.27 | 1.23 | 1.19 | 1.31 | 1.35 | 1.20 | 1.19 | 1.26 | 1.25 | 1.20 |
| $\lambda_d$ (nm) | 488 | 487 | 486 | 489 | 489 | 488 | 488 | 486 | 489 | 489 | 489 | 486 | 489 | 486 | 489 |
| $P_{D65}$ (%) | 6.0 | 7.1 | 7.7 | 6.4 | 5.0 | 4.6 | 6.1 | 6.7 | 5.1 | 4.5 | 5.9 | 6.9 | 5.1 | 6.1 | 3.8 |
| 4.85 mm |  |  |  |  |  |  |  |  |  |  |  |  |  |  |  |
| $LT_A$ (%) | 66.3 | 62.0 | 62.0 | 62.1 | 66.5 | 70.8 | 62.0 | 61.9 | 66.6 | 70.8 | 61.8 | 62.0 | 66.5 | 66.8 | 70.9 |
| $T_E$ (%) | 43.3 | 41.6 | 41.9 | 41.2 | 48.3 | 50.2 | 46.4 | 48.2 | 45.8 | 46.5 | 47.3 | 48.1 | 48.1 | 48.9 | 54.6 |
| SE | 1.53 | 1.49 | 1.48 | 1.51 | 1.38 | 1.41 | 1.34 | 1.28 | 1.45 | 1.52 | 1.31 | 1.29 | 1.38 | 1.37 | 1.30 |
| $\lambda_d$ (nm) | 487 | 487 | 485 | 489 | 488 | 488 | 488 | 485 | 489 | 489 | 489 | 486 | 489 | 486 | 489 |
| $P_{D65}$ (%) | 9.0 | 10.6 | 11.5 | 9.5 | 7.5 | 7.0 | 9.0 | 10.1 | 7.6 | 6.7 | 8.8 | 10.5 | 7.7 | 9.1 | 5.8 |

TABLE 3

|  | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| 3.85 mm |  |  |  |  |  |  |  |  |  |  |  |  |  |  |  |
| $LT_A$ (%) | 74.8 | 67.2 | 71.1 | 71.1 | 75.0 | 67.3 | 67.0 | 67.3 | 71.0 | 74.9 | 67.3 | 71.1 | 74.9 | 67.2 | 74.9 |
| $T_E$ (%) | 60.3 | 50.5 | 53.0 | 55.8 | 60.6 | 56.8 | 51.6 | 54.0 | 55.7 | 60.7 | 55.4 | 60.3 | 62.4 | 56.1 | 64.1 |
| SE | 1.24 | 1.33 | 1.34 | 1.27 | 1.24 | 1.18 | 1.30 | 1.25 | 1.27 | 1.23 | 1.21 | 1.18 | 1.20 | 1.20 | 1.17 |
| $\lambda_d$ (nm) | 488 | 487 | 489 | 488 | 487 | 489 | 487 | 489 | 489 | 487 | 489 | 489 | 487 | 489 | 488 |
| $P_{D65}$ (%) | 4.7 | 8.6 | 6.3 | 6.4 | 5.2 | 6.6 | 8.5 | 7.2 | 6.1 | 5.4 | 7.0 | 5.7 | 5.3 | 7.0 | 4.9 |
| 3.15 mm |  |  |  |  |  |  |  |  |  |  |  |  |  |  |  |
| $LT_A$ (%) | 77.6 | 71.0 | 74.4 | 74.4 | 77.8 | 71.2 | 70.9 | 71.2 | 74.4 | 77.7 | 71.1 | 74.4 | 77.7 | 71.1 | 77.7 |
| $T_E$ (%) | 64.8 | 55.7 | 58.0 | 60.7 | 65.1 | 61.7 | 56.8 | 59.1 | 60.6 | 65.1 | 60.4 | 64.9 | 66.6 | 61.1 | 68.2 |
| SE | 1.20 | 1.27 | 1.28 | 1.23 | 1.20 | 1.15 | 1.25 | 1.20 | 1.23 | 1.19 | 1.18 | 1.15 | 1.17 | 1.16 | 1.14 |
| $\lambda_d$ (nm) | 488 | 487 | 489 | 488 | 487 | 489 | 487 | 489 | 489 | 487 | 489 | 489 | 487 | 489 | 488 |
| $P_{D65}$ (%) | 4.7 | 7.1 | 5.2 | 5.3 | 4.3 | 5.4 | 7.0 | 6.0 | 5.1 | 4.4 | 5.8 | 4.7 | 4.4 | 5.8 | 4.1 |
| 4.85 mm |  |  |  |  |  |  |  |  |  |  |  |  |  |  |  |
| $LT_A$ (%) | 71.0 | 62.0 | 66.6 | 66.6 | 71.2 | 62.2 | 61.8 | 62.2 | 66.5 | 71.1 | 62.1 | 66.6 | 71.0 | 62.0 | 71.1 |
| $T_E$ (%) | 54.7 | 44.2 | 46.9 | 49.8 | 55.0 | 50.5 | 45.3 | 47.7 | 49.6 | 55.1 | 49.1 | 54.5 | 56.8 | 49.8 | 58.7 |

TABLE 3-continued

|    | 16   | 17   | 18   | 19   | 20   | 21   | 22   | 23   | 24   | 25   | 26   | 27   | 28   | 29   | 30   |
|----|------|------|------|------|------|------|------|------|------|------|------|------|------|------|------|
| SE | 1.30 | 1.40 | 1.42 | 1.34 | 1.29 | 1.23 | 1.36 | 1.30 | 1.34 | 1.29 | 1.26 | 1.22 | 1.25 | 1.24 | 1.21 |
| $\lambda_d$ (nm) | 488 | 486 | 489 | 488 | 487 | 489 | 487 | 489 | 489 | 487 | 489 | 489 | 487 | 489 | 488 |
| $P_{D65}$ (%) | 5.9 | 10.9 | 7.8 | 8.0 | 6.5 | 8.2 | 10.5 | 9.0 | 7.6 | 6.7 | 8.7 | 7.1 | 6.7 | 8.7 | 6.2 |

TABLE 4

|  | 31 | 32 | 33 | 34 | 35 | 36 | 37 | 38 | 39 | 40 | 41 | 42 |
|---|---|---|---|---|---|---|---|---|---|---|---|---|
| 3.85 mm |  |  |  |  |  |  |  |  |  |  |  |  |
| $LT_A$ (%) | 71.0 | 67.1 | 71.0 | 67.2 | 74.8 | 71.1 | 67.1 | 74.8 | 71.1 | 67.2 | 67.1 | 71.1 |
| $T_E$ (%) | 62.2 | 60.1 | 48.7 | 51.5 | 58.9 | 55.4 | 50.5 | 57.5 | 54.3 | 52.2 | 53.5 | 60.6 |
| SE | 1.14 | 1.12 | 1.46 | 1.30 | 1.27 | 1.28 | 1.33 | 1.30 | 1.31 | 1.29 | 1.25 | 1.17 |
| $\lambda_d$ (nm) | 486 | 489 | 488 | 489 | 489 | 488 | 487 | 488 | 489 | 485 | 489 | 488 |
| $P_{D65}$ (%) | 6.9 | 6.8 | 7.6 | 7.8 | 5.3 | 6.6 | 8.9 | 5.5 | 7.0 | 10.1 | 8.2 | 7.1 |
| 3.15 mm |  |  |  |  |  |  |  |  |  |  |  |  |
| $LT_A$ (%) | 74.4 | 71.0 | 74.3 | 71.1 | 77.6 | 74.4 | 71.0 | 77.6 | 74.4 | 71.1 | 71.0 | 74.4 |
| $T_E$ (%) | 66.6 | 64.8 | 53.8 | 56.8 | 63.5 | 60.3 | 55.8 | 62.1 | 59.3 | 57.4 | 58.7 | 65.1 |
| SE | 1.12 | 1.10 | 1.38 | 1.25 | 1.22 | 1.23 | 1.27 | 1.25 | 1.25 | 1.24 | 1.21 | 1.14 |
| $\lambda_d$ (nm) | 486 | 489 | 488 | 489 | 489 | 488 | 487 | 489 | 489 | 485 | 489 | 488 |
| $P_{D65}$ (%) | 5.6 | 5.6 | 6.3 | 6.5 | 4.3 | 5.5 | 7.4 | 4.5 | 5.8 | 8.3 | 6.8 | 5.9 |
| 4.85 mm |  |  |  |  |  |  |  |  |  |  |  |  |
| $LT_A$ (%) | 66.5 | 62.0 | 66.5 | 62.1 | 71.0 | 66.6 | 61.9 | 71.0 | 66.6 | 62.1 | 62.0 | 66.6 |
| $T_E$ (%) | 56.8 | 54.1 | 42.7 | 45.1 | 53.1 | 49.3 | 44.2 | 51.7 | 48.2 | 45.9 | 47.1 | 54.7 |
| SE | 1.17 | 1.15 | 1.56 | 1.38 | 1.34 | 1.35 | 1.40 | 1.37 | 1.38 | 1.35 | 1.32 | 1.22 |
| $\lambda_d$ (nm) | 486 | 489 | 488 | 489 | 489 | 488 | 487 | 488 | 489 | 485 | 489 | 488 |
| $P_{D65}$ (%) | 8.6 | 8.4 | 9.4 | 9.7 | 6.6 | 8.3 | 11.1 | 6.9 | 8.7 | 12.6 | 10.1 | 8.9 |

The invention claimed is:

1. A blue glass composition of silica-soda-lime type, comprising the coloring agents below in a content varying within the following limits, by weight:

| | |
|---|---|
| $Fe_2O_3$ (total iron) | 0.2 to 0.51% |
| CoO | 10 to 50 ppm |
| $Cr_2O_3$ | 10 to 300 ppm |
| CuO | 80 to 400 ppm | the glass exhibiting a redox factor of less than or equal to 0.35, a dominant wavelength $\lambda_D$ of between 485 and 489 nm, an excitation purity of less than 13% and a selectivity at least equal to 1.1 at a thickness of between 3 and 5 mm.

2. The glass composition as claimed in claim 1, wherein the iron content is greater than 0.3%.

3. The glass composition as claimed in claim 1, wherein CoO is present in an amount of from 15 to 40 ppm.

4. The glass composition as claimed in claim 1, wherein $Cr_2O_3$ is present in an amount greater than or equal to 20 ppm.

5. The glass composition as claimed in claim 4, wherein $Cr_2O_3$ is present in an amount of between 30 and 80 ppm.

6. The glass composition as claimed in claim 1, wherein CuO is present in an amount of less than 250 ppm.

7. The glass composition as claimed in claim 1, wherein the composition exhibits a selectivity of 1.3 or greater.

8. The glass composition as claimed in claim 1, wherein the compositions exhibits a light transmission $LT_A$ of 60% or greater.

9. The glass composition as claimed in claim 1, wherein $Cr_2O_3$ and CoO are present in amounts that satisfy the relationship:

$$100 \times Cr_2O_3/(CoO)_2 > 7.$$

10. The glass composition as claimed in claim 1, wherein the composition exhibits a redox of greater than 0.20.

11. The glass composition as claimed in claim 1, wherein the composition exhibits an excitation purity of less than 9%.

12. The glass composition as claimed in claim 1, wherein the composition exhibits a dominant wavelength of 487 nm or greater.

13. The glass composition as claimed in claim 1, further comprising at least one agent that modifies optical properties in certain parts of the spectrum, the agents being selected from the group consisting of $CeO_2$, $TiO_2$, $WO_3$, $La_2O_3$ and $V_2O_5$.

14. The glass composition as claimed in claim 13, wherein the at least one agent is present in an amount of 2% or less.

15. The glass composition as claimed in claim 1, comprising:

| | |
|---|---|
| $Fe_2O_3$ (total iron) | >0.45% |
| FeO | >0.15% |
| CoO | 10 to 50 ppm |
| $Cr_2O_3$ | 10 to 300 ppm |
| CuO | 80 to 400 ppm. | the glass exhibiting a light transmission $LT_A$ of greater than 70% and a selectivity of greater than 1.3 at a thickness on the order of 3.15 mm.

16. The glass composition as claimed in claim 15, wherein the composition exhibits an excitation purity of less than 9%.

17. The glass composition as claimed in claim 1, comprising:

| | |
|---|---|
| $Fe_2O_3$ (total iron) | >0.4% |
| FeO | >0.12% |
| CoO | <35 ppm |
| $Cr_2O_3$ | 10 to 300 ppm |
| CuO | 80 to 400 ppm | the glass exhibiting a light transmission $LT_A$ of greater than 60% and a selectivity of greater than 1.3 at a thickness on the order of 3.85 mm.

18. The glass composition as claimed in claim 17, wherein the composition exhibits a light transmission of greater than 70% and a selectivity of greater than 1.4.

19. The glass composition as claimed in claim 1, comprising:

| | |
|---|---|
| $Fe_2O_3$ (total iron) | >0.3% |
| FeO | >0.1% |
| CoO | <25 ppm |
| $Cr_2O_3$ | 10 to 300 ppm |
| CuO | 80 to 400 ppm | the glass exhibiting a light transmission $LT_A$ of greater than 60% and a selectivity of greater than 1.3 at a thickness on the order of 4.85 mm.

20. The glass composition as claimed in claim 19, wherein the compositions exhibits a dominant wavelength at least equal to 487 nm.

21. A glass sheet formed by floating the glass composition as claimed in claim 1 on a bath of molten metal.

22. A window comprising at least one glass sheet as claimed in claim 21.

* * * * *